(12) United States Patent
La Borde (10) Patent No.: US 7,190,108 B2
(45) Date of Patent: Mar. 13, 2007

(54) METHODS AND APPARATUS USING PULSED AND PHASED CURRENTS IN PARALLEL PLATES, INCLUDING EMBODIMENTS FOR ELECTRICAL PROPULSION

(76) Inventor: Benjamin La Borde, 204 Esplande, Irvine, CA (US) 92612

( * ) Notice: Subject to any disclaimer, the term of this patent is extended or adjusted under 35 U.S.C. 154(b) by 0 days.

(21) Appl. No.: 11/065,784

(22) Filed: Feb. 25, 2005

(65) Prior Publication Data
US 2005/0248252 A1    Nov. 10, 2005

Related U.S. Application Data

(63) Continuation-in-part of application No. 10/036,893, filed on Jan. 4, 2002, now abandoned.

(51) Int. Cl.
*F03H 1/00* (2006.01)
*F03F 3/00* (2006.01)

(52) U.S. Cl. .......................... 313/358; 315/3.5; 331/82; 330/43; 330/287

(58) Field of Classification Search .................. 310/12, 310/15, 17, 25, 36–37, 305, 308; 313/358; 250/493.1; 330/43, 287; 315/3.5; 331/82
See application file for complete search history.

(56) References Cited

U.S. PATENT DOCUMENTS

| 3,171,086 | A  | * | 2/1965  | Horst ........................... 330/43 |
| 4,888,522 | A  | * | 12/1989 | Weingart ............... 315/111.61 |
| 6,732,978 | B2 |   | 5/2004  | Ockels et al. |
| 6,786,035 | B2 |   | 9/2004  | Stickelmaier |
| 2004/0161332 | A1 |   | 8/2004  | Rabinowitz et al. |
| 2004/0164205 | A1 |   | 8/2004  | Kellberg |
| 2004/0223852 | A1 |   | 11/2004 | Hartley |
| 2004/0245407 | A1 |   | 12/2004 | D'Ausilio et al. |

* cited by examiner

*Primary Examiner*—Tran Nguyen
(74) *Attorney, Agent, or Firm*—Rutan & Tucker, LLP (57) ABSTRACT

First and second parallel conducting plates include arrayed conducting segments, preferably with specific spacing relative to each other and to the separation of the plates. Currents through the conducting segments are pulsed and phased to produce constructive but unequal interference on the two plates. Among other things, the net result of the interference can produce a net force on the device, and in that manner can be used for propulsion. Preferred devices have up 100 segments or more.

4 Claims, 9 Drawing Sheets

METHODS AND APPARATUS USING
PULSED AND PHASED CURRENTS IN
PARALLEL PLATES, INCLUDING
EMBODIMENTS FOR ELECTRICAL
PROPULSION

This application is a Continuation In Part of Ser. No. 10/036,893 filed Jan. 4, 2002 now abandoned, which is incorporated by reference herein in its entirety.

FIELD OF THE INVENTION

The field of the invention is space propulsion systems.

BACKGROUND

Space travel requires propulsion systems. Current systems are based upon a chemical propellant, which adds tremendously to the weight of the craft, and is readily expended. Ion propulsion systems have been suggested, but they typically have an output of about 0.1 Newton. Moreover, the output is substantially limited because such devices are thought to be non-scalable. See e.g., 20040245407, 20040223852, 20040164205, 20040161332, U.S. Pat. Nos. 6,786,035, and 6,732,978. These and all other cited materials are incorporated herein by reference.

What is needed is a propulsion system that is non-chemically based to support greater longevity, and is scalable to provide greater output than previously contemplated ion thrusters.

SUMMARY OF THE INVENTION

The present invention provides apparatus and methods in which first and second parallel conducting plates, distance a apart, include a plurality of arrayed segments, at least some of the segments on each of the plates has a length of l, wherein $0 < l \leq 100a$; and a first current of pulse width p1 that passes through at least one of the segments of the first plate, wherein $0 < p1 \leq 3a/2c$, and c is the speed of light.

In preferred embodiments the first current has frequency of between 0.5 and 1000 gHz, more preferably between 0.75 and 100 gHz. In general, the preferred frequency is $c/(3a) \pm 25\%$. The wave form of such current is preferably a step wave, with a duty cycle between 0.5 and 0.8, more preferably between 0.6 and 0.7, and most preferably about $2/3$. Alternatively, the wave form can be constructed from sinusoids and/or exponentials. Typically, there will be a different current in each of the plates, the different currents being out of phase by $2\pi/3 \pm 20\%$ The plates are preferably constructed of a non-conducting medium, and can include any realistic number of segments. Preferred devices have at least 10 segments, more preferably at least 20 segments, but can advantageously include of up 100 segments, or even up to 1000 segments or more. The segments in each plate are preferably arranged in an orthogonal array, as for example a rectangular array, which can include one or more holes (missing segments).

The segments can comprise any suitable conductor, including one or more conventional conductors and/or superconductors.

The claimed apparatus and methods can be utilized as a radio jammer, a microwave generator, and as a propulsion device.

Various objects, features, aspects and advantages of the present invention will become more apparent from the following detailed description of preferred embodiments of the invention, along with the accompanying drawings in which like numerals represent like components.

DETAILED DESCRIPTION

Figure 1:
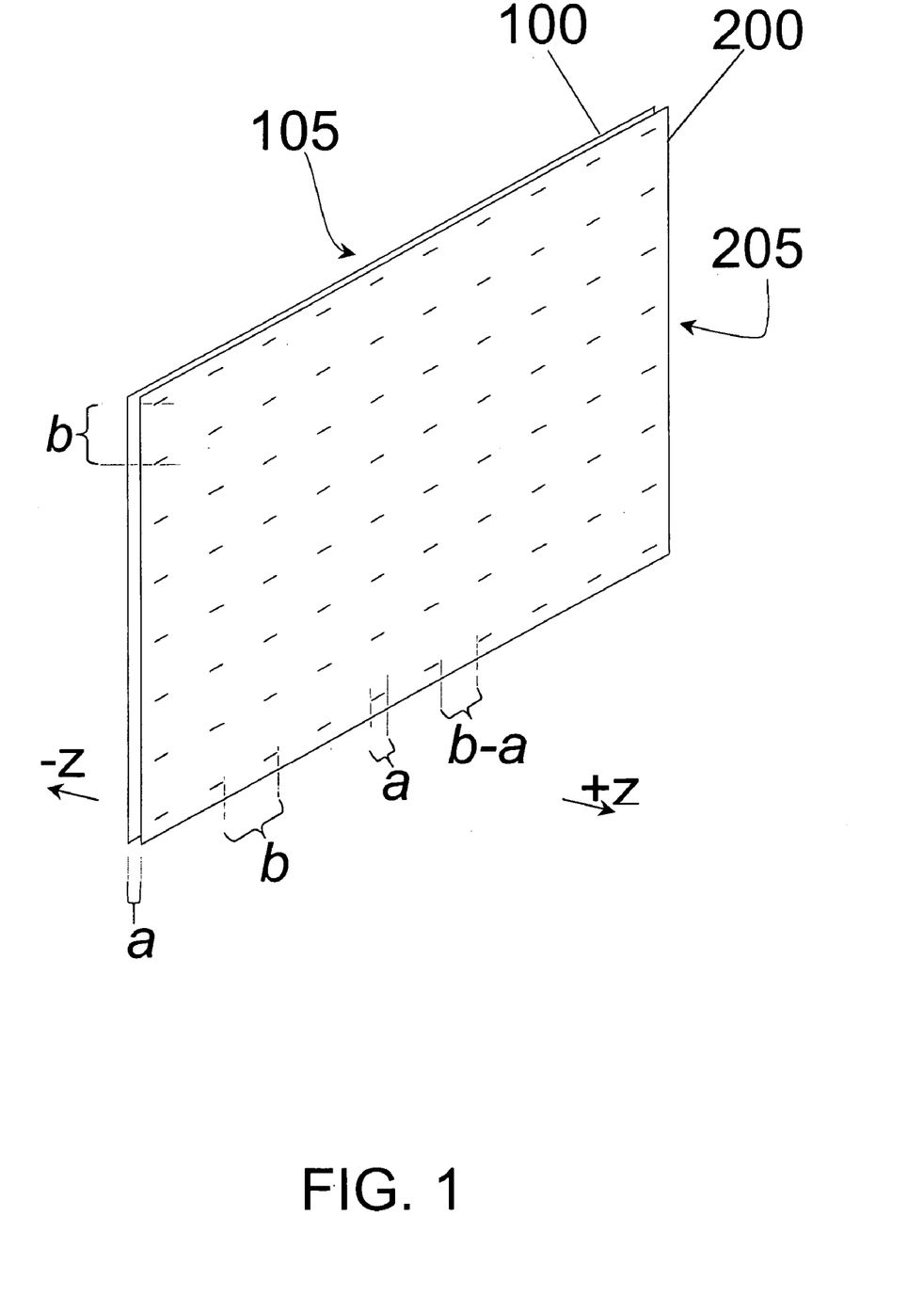
FIG. 1 is a perspective view of two plates, each plate having a plurality of conducting segments.

FIG. 1 generally shows a first plate 100 and a parallel second plate 200. Each of the plates 100 and 200 includes an array 105, 205, respectively, of conducting segments, 110 and 210, respectively. To simplify discussions herein, the plates of FIG. 1 are deemed to be vertical.

First plate 100 is substantially flat, rigid, and nonconductive except for the segments 110. Plate 100 can, for example, comprise a non- or poorly conducting polymer such as those used in constructing circuit boards. Physical size can range from centimeters to kilometers, with preferred sizes in the meter range. The length doesn't have to equal the width, and indeed the plate 100 need not even be rectangular. The thickness, however, should be considerably less than the length or width (or diameter), preferably at least hundreds of times thinner. Preferred thicknesses are in the mm range. Second plate 200, can be different in one or more respects from the first plate 100, but is advantageously almost identical to first plate 100.

Array 105 comprises a plurality of segments of length a. Array 105 is preferably regular, but can have holes and can be irregular in other ways. Where array 105 is regular, the vertical separation between vertically adjacent segments is advantageously about $\sqrt{15}a$, and the horizontal separation between horizontally adjacent segments is advantageously about $(\sqrt{15}-1)a$. Other separations are contemplated, however, these stated separations are considered preferable because they reduce destructive signal interference and increase constructive signal interference. Array 205, can be different in one or more respects from the array 105, but is advantageously almost identical to array 105, so that individual segments on the two plates 100, 200 are aligned next to each other, at a distance a.

Segments 110, 210 must be electrically conductive. For that purpose the segments can include one or more conventional conductors (Ag, Au, Cu, etc), and/or one or more superconductors (nanotubes, supercooled materials etc). Length of the various segments is preferably a, which is calculated to reduce destructive signal interference and increase constructive signal interference. Operationally suitable lengths for the segments are currently contemplated to be in the centimeter to meter range. The width of the segments is preferably in the mm range, and in many instances the thickness is approximately or exactly the same size as the width. In wires, for example, the width and thickness are effectively the diameter. Other, less desirable dimensions are also contemplated, especially those that vary less than 10 fold from the stated dimensions.

Figure 2:
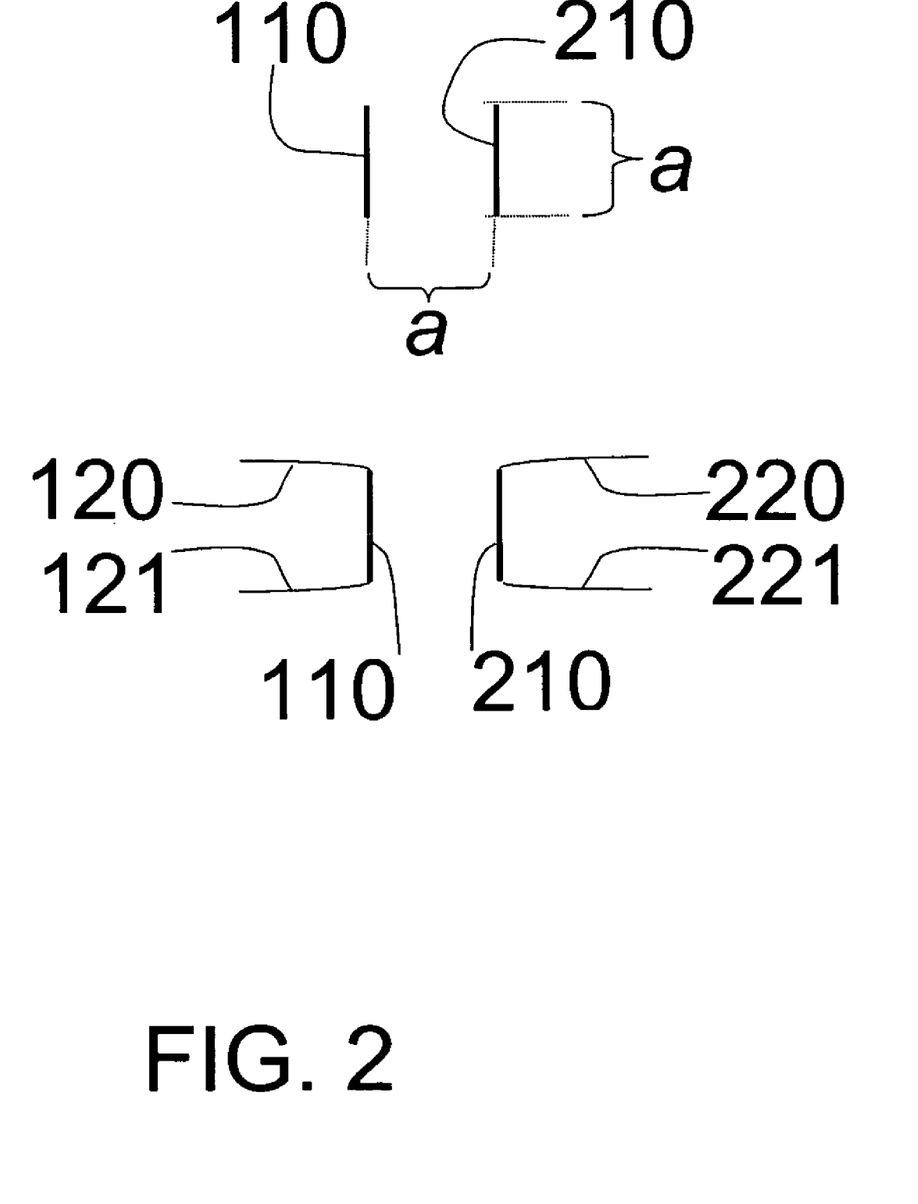
FIG. 2 is a plan view of two paired segments and their feeder wires on the plates of FIG. 1.

In FIG. 2 the lengths of segments 110 and 210 are both a, and their separation is also a. In addition, feeder wires 120, 121, 220, 221 lead orthogonally away from the two plates in order to prevent electromagnetic interference between the feeder wires and the conducting segments. The feeder wires are preferably of the same conducting material(s) as the segments to which they connect, and lead to a power supply. There may be different feeder wires for each of the different segments, or a plurality of segments can be serviced by a given feeder wire. The feeder wires are electrically connected to one or more power supplies (directly or indirectly), with different power supplies preferably being used for the different plates. Differences in the phases of signals to the different plates can be managed by the power supply or supplies, or can be provided in any other suitable control mechanism. A very simple phase delay can be implemented by passing the current through a sufficiently long wire.

Figure 3:
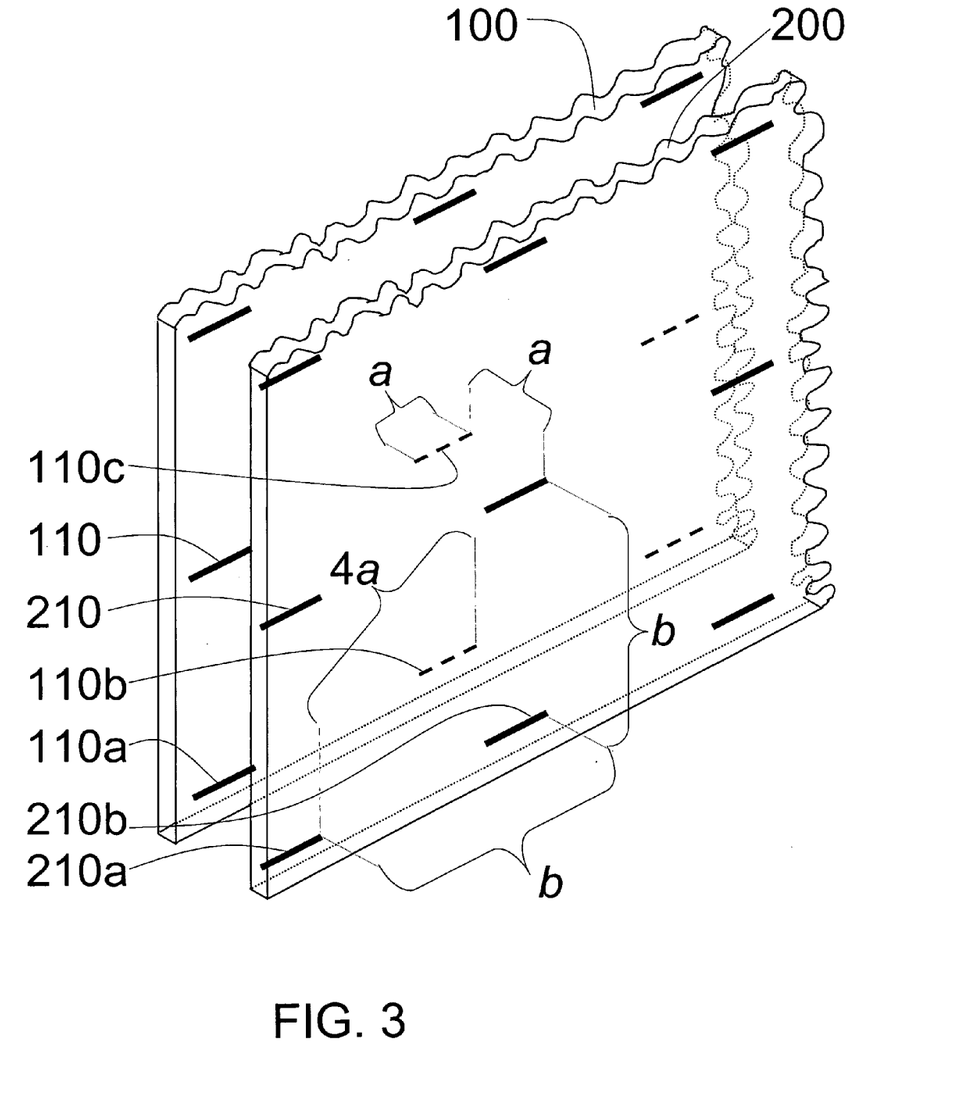
FIG. 3 is a transparency view of the two plates of FIG. 1 showing geometric separation of various segments.

In FIG. 3 the preferred distance between segments in the same plate, from the start of one segment to the start of an adjacent segment, is shown to be b=√15a. For example, the distance between exemplary segments 110a and 110b is b=√15a, and the distance between exemplary segments 210a and 210b is b=√15a. Since the distance between 110a and 210a is a, the diagonal distance between 210a and 110b is 4a. Also in this figure the preferred vertical distance between 110b and 110c is b=√15a. The same distance preferably holds for vertical distances between other vertically adjacent segments. However, as discussed above, all of these distances are merely preferences, designed to optimize operation.

Figure 4:
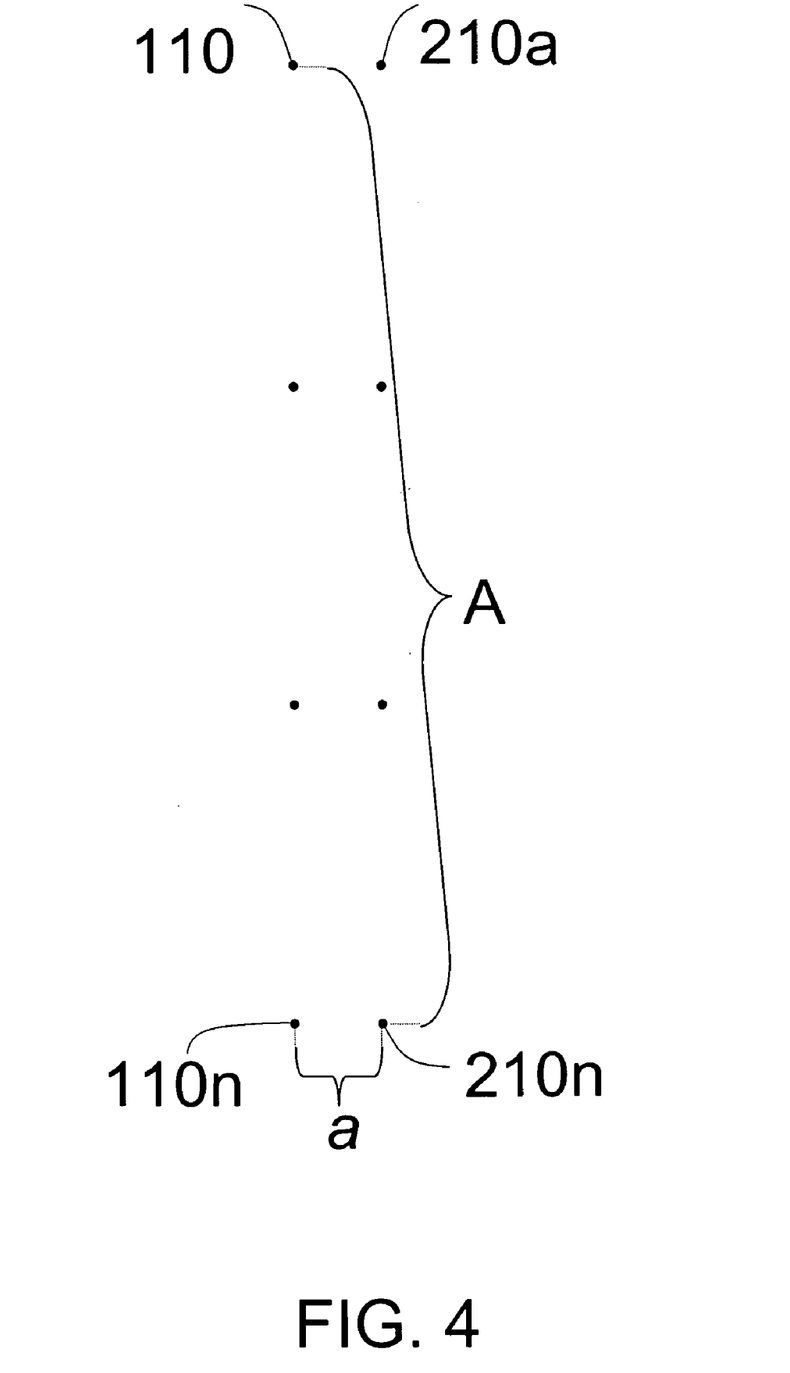
FIG. 4 is an edge view of the two plates of FIG. 1, further showing geometric separation of various segments.

In FIG. 4 the diagonal distance A between segments that are n elements vertically apart, and in opposing plates, is √1+15n²a. For example, if n=3, then the distance between 110a and 210n is √1+15*3²a.

Figure 5:
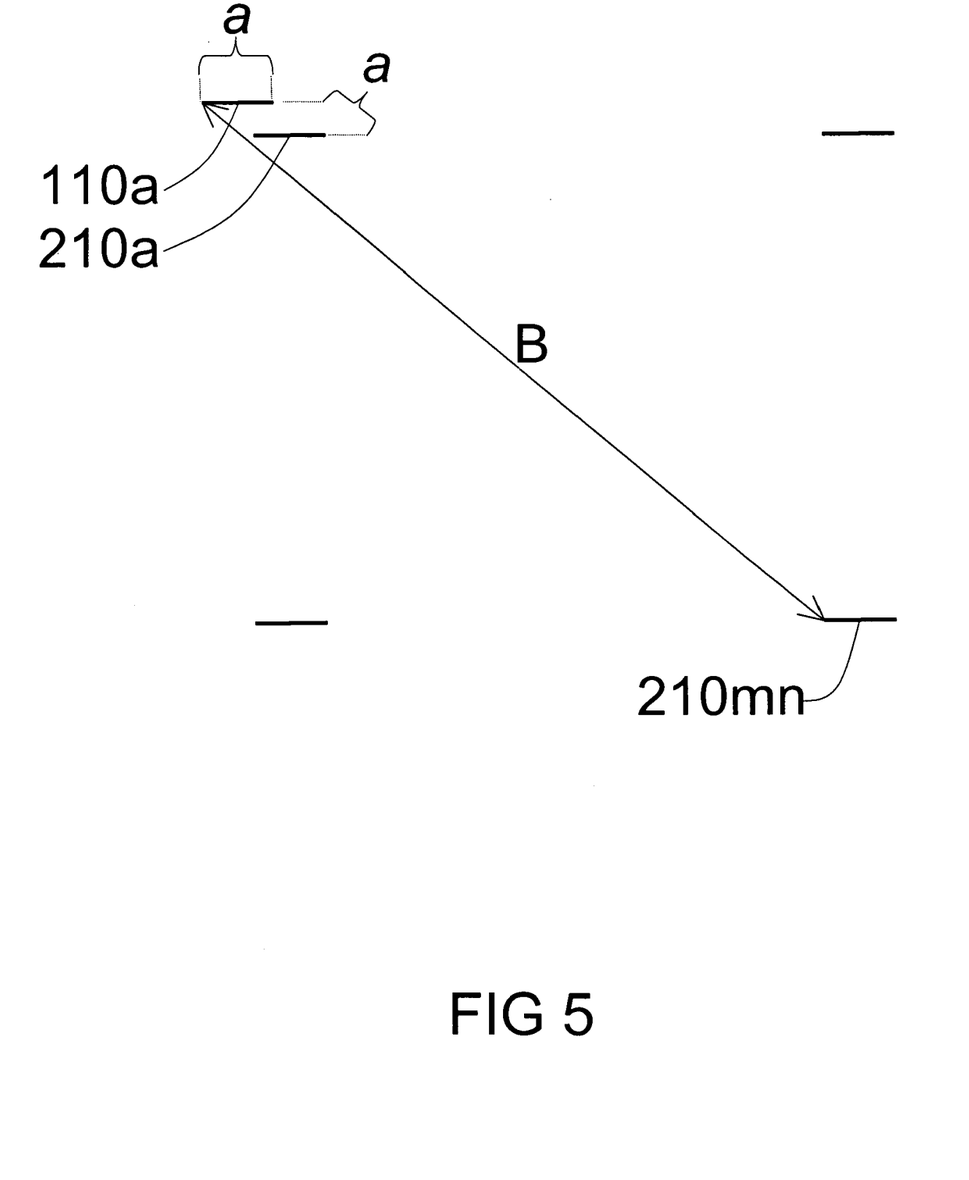
FIG. 5 is a front view of the two plates of FIG. 1, showing the geometric separation of diagonal segments.

In FIG. 5 a different diagonal distance B between segments that are n vertically elements apart and m elements apart horizontally, and again in opposing plates, is √1+15(m²+n²)a. For example, if n=3, and m=2, then the distance between 110a and 210 nm is √1+15(2²+3²)a.

Figure 6:
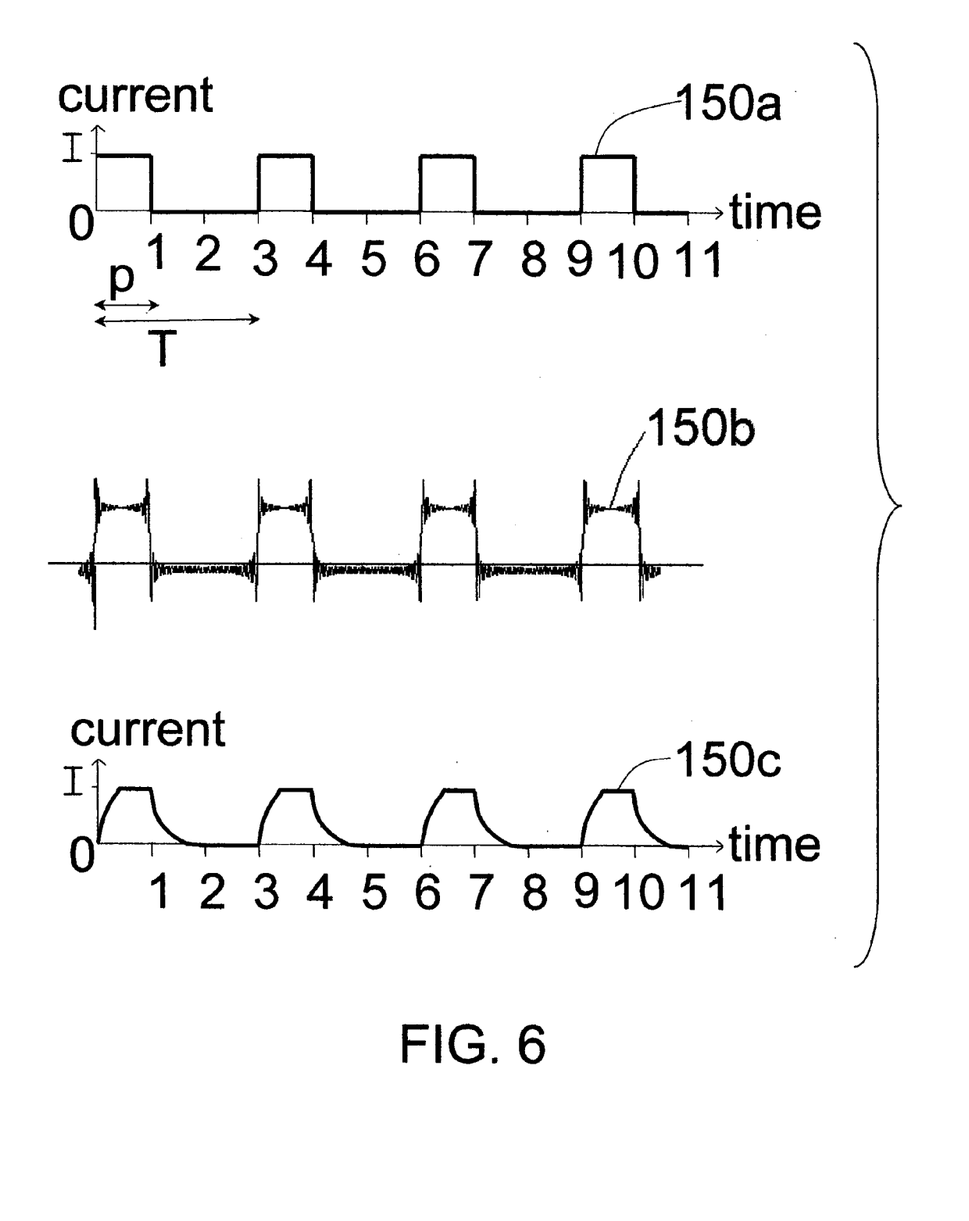
FIG. 6 is a schematic of a current pulse in which pulse widths (duration), p, are $1/3$ of the cycle.

In FIG. 6, a step wave 150a of plate 100 has a duty cycle of ⅔. The frequency is c/(3a). In alternative embodiments, wave 150b is constructed of sinusoids, and wave 150c is constructed of exponentials. The frequency is preferably c/(3a), although it could range between 0.5 and 1000 gHz, more preferably between 0.75 and 100 gHz. In general, the preferred frequency is c/(3a)±25%.

Figure 7:
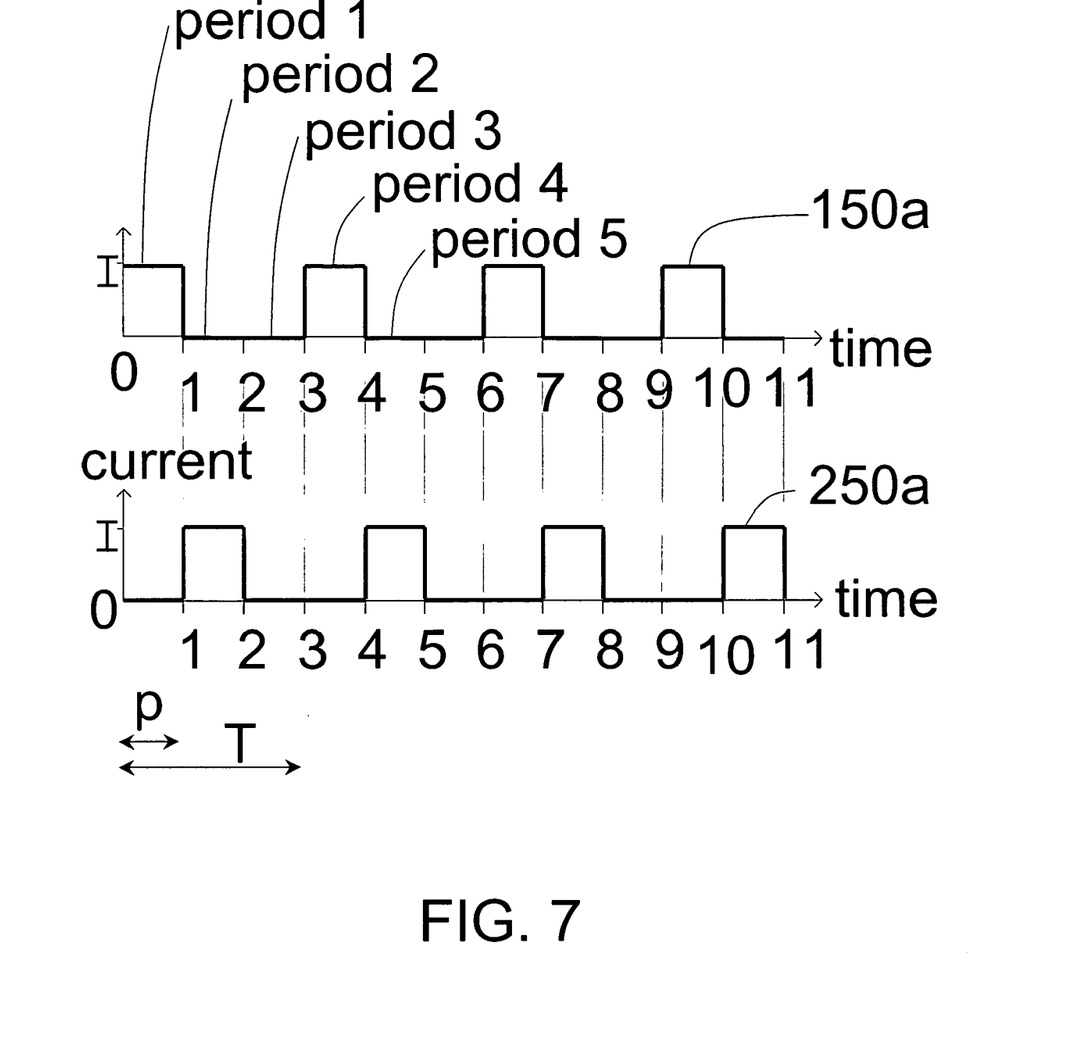
FIG. 7 is a phase diagram of two pulses of FIG. 6, showing phase relationship of the currents on the two plates of FIG. 1.

In FIG. 7, a step wave 150a of plate 100 is shown to be 2π/3 phase delay with respect to step wave 250a of plate 200.

Figure 8:
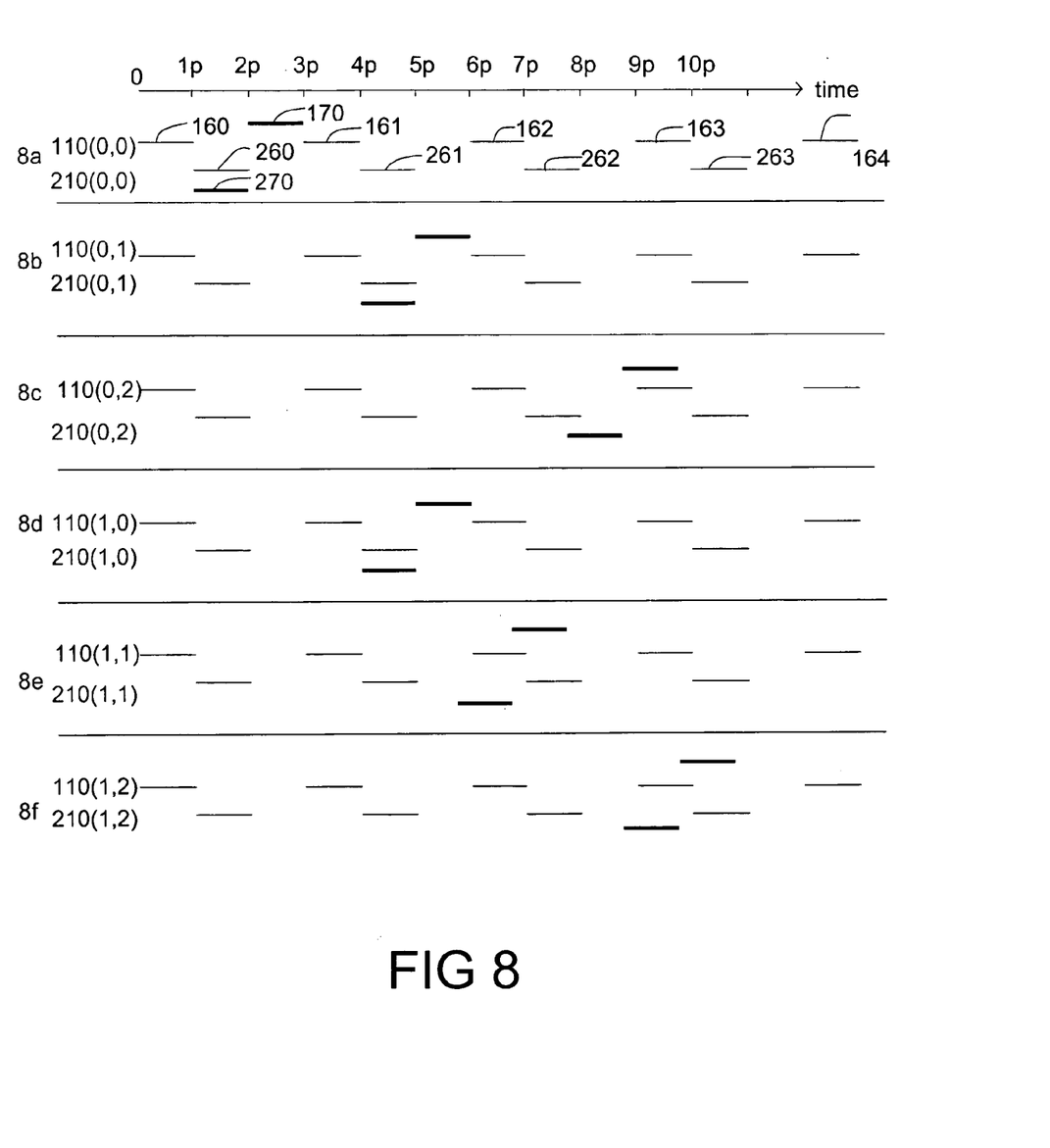
FIG. 8 is a chart showing timing differences of signals arriving at various segments on the two plates of FIG. 1.

In FIG. 8, array 105 includes segments 110(0,0), 110(0,1), 110(0,2), 110(1,0), 110(1,1), and 110(1,2), where the index (0,0) is the local origin for this analysis, and the index (n,m) indicates, the segment n vertically and m horizontally form the origin. Similar nomenclature applies for array 205. Time proceeds along the abscissa axis, left to right. Each portion of the graph 8a, 8b, 8c, 8d, 8e, 8f, has thin lines 160–164 and 260–263, and thick lines 170 and 270. Thin lines 160–164 represent the on period in a given pulse at segment 110(0,0). Thin lines 260–263 represent the on period in a given pulse at segment 210(0,0). Thick line 170 represent the arrival of the 210(0,0) signal on a given segment 110(m,n) of plate 100, and thick line 270 represent the arrival of the segment 110(0,0) signal on a given segment 210(m,n) of plate 200. Among other things, FIG. 8 illustrates the phasing of interference for various segments, showing that segments further away from the segment 110(0,0) have less optimal interference. Obviously, any segment in array 105 can be considered 110(0,0) in the analysis.

As used herein, the term "relative overlap" refers to the paired segments, 110(0,0) & 210(m,n), and means the period for which the 110(0,0) signal arrives simultaneously while segment 210(n,m) is conducting. The term "relative overlap" applies similarly to the paired segments, 210(0,0) & 110(m,n), and means the period for which the 210(0,0) signal arrives simultaneously while segment 110(n,m) is conducting. Those skilled in the art will appreciate that in portion 8a the relative overlap of plate 100 on plate 200 is 1 (i.e., 100%), and the relative overlap of 200 on plate 100 is zero. In portion 8b the corresponding relative overlaps are 1 and 0 (zero); in portion 8c the relative overlaps are 8−7.810=0.19 and 1−(8−7.810)=0.81; in portion 8d the relative overlaps are 1 and 0; in portion 8e the relative overlaps are 0 and 6−5.568=0.432; in portion 8f the relative overlaps are 0 and 9−8.718=0.282. See formulae accompanying descriptions of FIGS. 4 and 5 for calculations for above.

Uses

A device containing plates 100 and 200, operated using the signal timing shown in FIG. 7, can be utilized in many ways. One use is as a radio jamming. In that case the device would operate as a very high frequency emitter, covering a wide range of frequencies. It can also be used as a food or other microwave transmitter.

Figure 9:
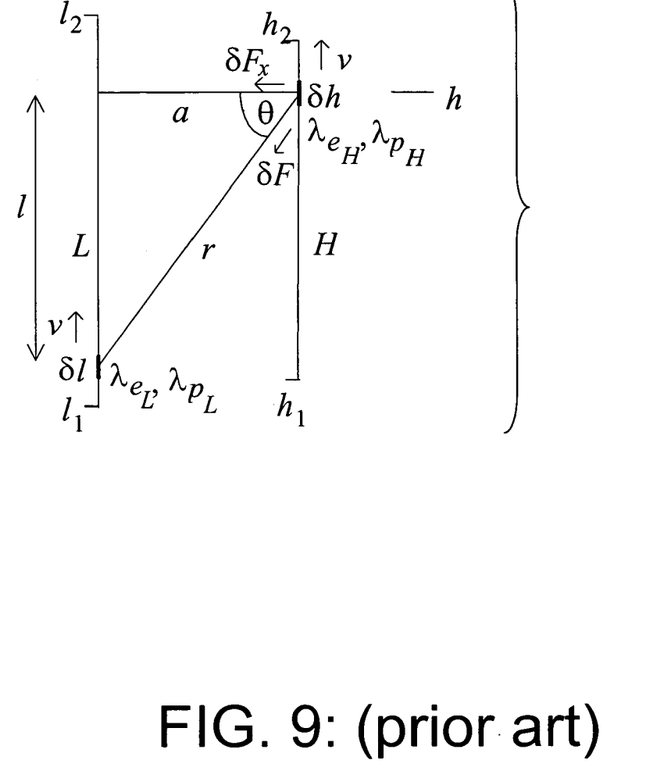
FIG. 9 is a prior art schematic of relativistic force between two current carrying wires.

In addition, it is also contemplated that the device can be used to produce propulsion. Support for that use is based upon relativistic analysis. FIG. 9 supports the derivation of relativistic forces showing this method of analysis to produce equivalent results to conventional electromagnetic analysis. In FIG. 9 two parallel wires L and H, carrying equal currents, are separated in vacuum by a distance a.

| | |
|---|---|
| $\lambda_{eL}$ | electron density in L |
| $\lambda_{pL}$ | proton density in L |
| $\lambda_{eH}$ | electron density in H |
| $\lambda_{pH}$ | proton density in H |
| v | electron velocity |
| δl | short current segment in L |
| δh | short current segment in H |
| $\mu_0$ | permeability of free space |
| $\epsilon_0$ | permittivity of free space |
| c | velocity of light |

The force δF on δh at point h is composed of electrostatic and electrodynamic components:

component [1]: Electrostatic force in the rest frame of $\lambda_{pL}$ and $\lambda_{pH}$, due to the interaction of $\delta l \lambda_{pL}$ and $\delta h \lambda_{pH}$; this is a repulsive force, hence denoted −ve:

$$\frac{-\delta l \lambda_{P_L} \delta h \lambda_{P_H}}{4\pi\varepsilon_0 r^2}.$$

component [2]: Electrostatic force in the rest frame of $\lambda_{eL}$ and $\lambda_{eH}$, due to the interaction of $\delta/\lambda_{eL}$ and $\delta h\lambda_{eH}$; this is a repulsive force, hence denoted −ve:

$$\frac{-\delta l \lambda_{e_L} \delta h \lambda_{e_H}}{4\pi\varepsilon_0 r^2}.$$

component [3]: Relativistic electrodynamic force in the rest frame of $\lambda_{pL}$, due to the interaction of $\delta/\lambda_{pL}$ and $\delta h\lambda_{eH}$; this is an attractive force, hence denoted +ve:

$$\frac{\delta l \lambda_{P_L} \delta h \lambda_{e_H} \frac{\delta h}{\delta h'}}{4\pi\varepsilon_0 r^2}$$

where $\delta h'$ is given by the Lorentz length contraction $$\delta h' = \delta h \sqrt{1-\frac{v^2}{c^2}}.$$

Hence this force component is $$\frac{\delta l \lambda_{P_L} \delta h \lambda_{e_H}}{4\pi\varepsilon_0 r^2 \sqrt{1-\frac{v^2}{c^2}}}.$$

component [4]: Relativistic electrodynamic force in the rest frame of $\lambda_{pH}$, due to the interaction of $\delta/\lambda_{eL}$ and $\delta h\lambda_{pH}$; this is an attractive force, hence denoted +ve:

$$\frac{\delta l \lambda_{e_L} \frac{\delta L}{\delta l'} \delta h \lambda_{P_H}}{4\pi\varepsilon_0 r^2}.$$

Similarly, as for component [3], relativistic Lorentz length contraction gives $$\delta l' = \delta l \sqrt{1-\frac{v^2}{c^2}}.$$

Hence this force component is $$\frac{\delta l \lambda_{e_L} \delta h \lambda_{P_H}}{4\pi\varepsilon_0 r^2 \sqrt{1-\frac{v^2}{c^2}}}.$$

Figure 10:
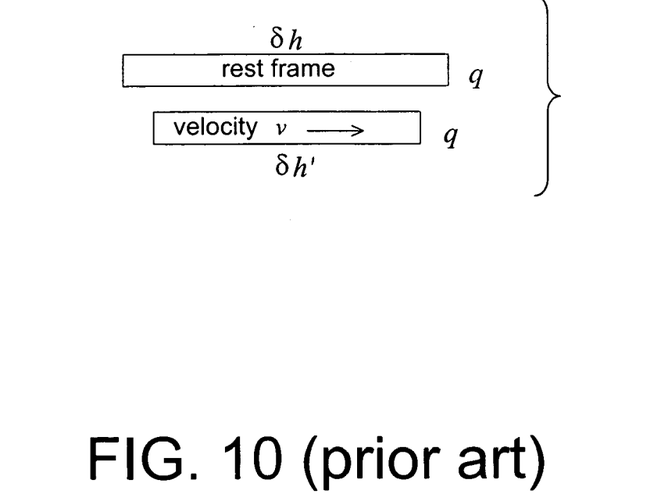
FIG. 10 is a prior art schematic of Lorentz relativistic length contraction, and relativistic charge density.

The factors $$\frac{\delta h}{\delta h'}$$

in [3], and $$\frac{\delta l}{\delta l'}$$

in [4] are due to the apparent increase in charge density in a moving frame. The velocity v is the electron drift velocity, i.e., the current through the wire. Then from the viewpoint of the rest frame the length $\delta h$ contracts to $$\delta h' = \delta h \sqrt{1-\frac{v^2}{c^2}}$$

as illustrated in FIG. 10. (In FIG. 10, the term q denotes the charge in a small length $\delta h$. This q is introduced here for illustration only, and is not used generally in the derivation).

The total charge within $\delta h$ remains unchanged, since charge is invariant under relativistic transformation. However, the length $\delta h$ itself is not invariant; hence the actual charge $\lambda\delta h$ now appears to occupy a shorter length, $\delta h'$, and so the charge density appears to increase by the factor $$\frac{\delta h}{\delta h'}, \text{ i.e., } \frac{1}{\sqrt{1-\frac{v^2}{c^2}}}.$$

Then the force $\delta F$ on segment $\delta h$ is the sum of the forces from components [1], [2], [3] and [4]:

$$\delta F = -\frac{\delta l \lambda_{P_L} \delta h \lambda_{P_H}}{4\pi\varepsilon_0 r^2} - \frac{\delta l \lambda_{e_L} \delta h \lambda_{e_H}}{4\pi\varepsilon_0 r^2} + \frac{\delta l \lambda_{P_L} \delta h \lambda_{e_H}}{4\pi\varepsilon_0 r^2 \sqrt{1-\frac{v^2}{c^2}}} + \frac{\delta l \lambda_{e_L} \delta h \lambda_{P_H}}{4\pi\varepsilon_0 r^2 \sqrt{1-\frac{v^2}{c^2}}}$$

Having derived the force $\delta F$ in terms of these 4 components, the expression can now be simplified by noting that $\lambda_{pL}=\lambda_{pH}$ and $\lambda_{eL}=\lambda_{eH}$. Also, since attractive and repulsive components were ascribed their appropriate signs in components [1], [2], [3] and [4], all the $\lambda$ terms represent the absolute charge density, so $\lambda_e=\lambda_p$ (for L and H).

These simplifications represent notational changes only; the physical properties are unchanged. Thus $$\delta F = \frac{\lambda\lambda}{4\pi\varepsilon_0 r^2}\left(-1-1+\frac{1}{\sqrt{1-\frac{v^2}{c^2}}}+\frac{1}{\sqrt{1-\frac{v^2}{c^2}}}\right)\delta l \delta h$$

ie

-continued $$\delta F = \frac{2\lambda\lambda}{4\pi\varepsilon_0 r^2}\left(-1 + \frac{1}{\sqrt{1 - \frac{v^2}{c^2}}}\right)\delta l \delta h$$

The term $$\frac{1}{\sqrt{1 - \frac{v^2}{c^2}}}$$

can be re-expressed by the binomial expansion for $(1-x)^{-1/2}$:

$$(1-x)^{-1/2} = 1 + \frac{x}{2} + \frac{3}{8}x^2 + \frac{5}{16}x^3 + \frac{35}{128}x^4 + \frac{63}{256}x^5 + \ldots$$

$$(1-x)^{-1/2} = 1 + \frac{x}{2} + \frac{3}{8}x^2 + \frac{5}{16}x^3 + \frac{35}{128}x^4 + \frac{63}{256}x^5 + \Lambda$$

$$\left(\text{from } (1+x)^{-1/2} = 1 - \frac{x}{2} + \frac{3}{8}x^2 + \frac{5}{16}x^3 - \frac{35}{128}x^4 - \frac{63}{256}x^5 + \Lambda\right)$$

Applying this to the parenthesized term in the expression for $\delta F$ above, $$-1 + \left(1 - \frac{v^2}{c^2}\right)^{-1/2} = (1-x)^{-1/2}$$

$$= -1 + \left(1 + \frac{v^2}{2c^2} + \frac{3}{8}\frac{v^4}{c^4} + \frac{5}{16}\frac{v^6}{c^6} + \frac{35}{128}\frac{v^8}{c^8} + \frac{63}{256}\frac{v^{10}}{c^{10}} + \Lambda\right)$$

$$= \frac{v^2}{2c^2} + \frac{3}{8}\frac{v^4}{c^4} + \frac{5}{16}\frac{v^6}{c^6} + \frac{35}{128}\frac{v^8}{c^8} + \frac{63}{256}\frac{v^{10}}{c^{10}} + \Lambda$$

Typically the drift velocity $v \approx 10^{-4}$ ms$^{-1}$, so $\frac{v}{c} \approx 10^{-12}$ and $$\frac{v^2}{c^2} \approx 10^{-24}.$$

Hence $$\frac{v^2}{2c^2}$$

dominates in the expansion above. Using this approximation $\delta F$ becomes, $$\delta F \approx \frac{2\lambda\lambda}{4\pi\varepsilon_0 r^2}\left(\frac{v^2}{2c^2}\right)\delta l \delta h$$

Given that c>>v, this approximation will now be used in equality form in the continuation of this derivation, with no significant loss of accuracy. Thus $\delta F$ is expressed as $$\delta F = \frac{\lambda\lambda}{4\pi\varepsilon_0 r^2}\frac{v^2}{c^2}\delta l \delta h$$

This is the attractive force on $\delta h$, in the direction of r, due to the equal currents in wire segments $\delta l$ and $\delta h$. The perpendicular force between the wires is $\delta F_x = \delta F \cos\theta$, where cos $$\cos\theta = \frac{a}{r}.$$

Therefore $$\delta F_x = \frac{\lambda\lambda}{4\pi\varepsilon_0 r^2}\frac{v^2}{c^2}\frac{a}{r}\delta l \delta h$$

Given this expression for the force attributable to small segments $\delta l$ and $\delta h$ on their respective wires L and H, it's now possible to find the total force on wire H by integrating over the interested lengths of the wires over their respective limits. First, the force on $\delta h$ due to the entire wire L between limits $l_1$ and $l_2$ is simply the integral of $\delta F_x$ over L. Call this $\delta F_h$:

$$\delta F_j = \int_{l_1}^{l_2} \frac{\lambda\lambda}{4\pi\varepsilon_0 r^2}\frac{v^2}{c^2}\frac{a}{r}\delta h \delta l$$

The limits in l need to be expressed in terms of position h, since they are measured from $\delta h$, situated at point h.

$$\delta F_h = \int_{l_1-h}^{l_2-h} \frac{\lambda\lambda}{4\pi\varepsilon_0 r^2}\frac{v^2}{c^2}\delta h \delta l$$

Then the total force on wire H between limits $h_1$ and $h_2$, is the integral of $\delta F_h$ over H. Call this F:

$$F = \int_{h_1}^{h_2}\int_{l_1-h}^{l_2-h} \frac{\lambda\lambda}{4\pi\varepsilon_0 r^2}\frac{v^2}{c^2}\frac{a}{r}\delta l \delta h$$

Substitute in $r^2=a^2+l^2$ (from FIG. 9):

$$F = \frac{\lambda\lambda}{4\pi\varepsilon_0}\int_{h_1}^{h_2}\int_{l_1-h}^{l_2-h}\frac{v^2}{c^2}\frac{1}{a^2+l^2}\frac{a}{(a^2+l^2)^{1/2}}\delta l \delta h$$

Simplify, $$F = \frac{\lambda\lambda v^2}{4\pi\varepsilon_0 c^2}\int_{h_1}^{h_2}\int_{l_1-h}^{l_2-h}\frac{a}{(a^2+l^2)^{3/2}}\delta l \delta h$$

Substitute in $$\mu_0 = \frac{1}{\varepsilon_0 c^2} \text{ and}$$

$$I = \lambda v \left(\text{from } \lambda = \frac{dq}{dl}, v = \frac{dl}{dt} \Rightarrow \lambda v = \frac{dq}{dl}\frac{dl}{dt} = \frac{dq}{dt} = I\right)$$

$$F = \frac{\mu_0 I^2}{4\pi}\int_{h_1}^{h_2}\int_{l_1-h}^{l_2-h}\frac{a}{(a^2+l^2)^{3/2}}\delta l \delta h$$

The integral over $l$ is soluble with the standard integral $$\int \frac{dx}{(a^2+x^2)^{3/2}} = \frac{x}{a^2(a^2+x^2)^{1/2}}$$

$$F = \frac{\mu_0 I^2}{4\pi}\int_{h_1}^{h_2}\left[\frac{al}{a^2(a^2+l^2)^{1/2}}\right]_{l_1-h}^{l_2-h} dh$$

Apply the limits:

$$F = \frac{\mu_0 I^2}{4\pi a}\int_{h_1}^{h_2}\frac{l_2-h}{\{a^2+(l_2-h)^2\}^{1/2}} - \frac{l_1-h}{\{a^2+(l_1-h)^2\}^{1/2}} dh$$

This can be integrated using the standard integral:

$$\int \frac{l-x}{\{a^2+(l-x)^2\}^{1/2}} dx = -\{a^2+(l-x)^2\}^{1/2}$$

Thus $$F = \frac{\mu_0 I^2}{4\pi a}\left[-\{a^2+(l_2-h)^2\}^{1/2} + \{a^2+(l_1-h)^2\}^{1/2}\right]_{h_1}^{h_2}$$

Apply the limits:

$$F = \frac{\mu_0 I^2}{4\pi a}\left[-\{a^2+(l_2-h_2)^2\}^{1/2} + \{a^2+(l_1-h_2)^2\}^{1/2} + \{a^2+(l_2-h_1)^2\}^{1/2} - \{a^2+(l_1-h_1)^2\}^{1/2}\right] \quad (i)$$

This is the general form for the force on wire H along length $h_2-h_1$ caused by the current in wire L along length $l_2-l_1$. This is equation (i) used as the basis of the force calculations set forth below.

To corroborate this form consider equal lengths and alignment of lengths L and H so that $h_1=l_1$ and $h_2=l_2$. Then $h_1-l_1=0$, $h_2-l_2=0$ and $h_2-l_1=l_2-h_1=L$ (say).

Then $$F = \frac{\mu_0 I^2}{4\pi a}\left[-(a^2)^{1/2} + (a^2+L^2)^{1/2} + (a^2+L^2)^{1/2} - (a^2)^{1/2}\right]$$

ie $$F = \frac{\mu_0 I^2}{2\pi a}\left[(a^2+L^2)^{1/2} - a\right]$$

and the force per meter is $$\frac{F}{L} = \frac{\mu_0 I^2}{2\pi a}\left[\frac{(a^2+L^2)^{1/2}}{L} - \frac{a}{L}\right]$$

For very long L such that L>>a $$\frac{F}{L} \approx \frac{\mu_0 I^2}{4\pi a}\left[\frac{L}{L} - 0\right]$$

Finally, for the infinite wire scenario $$\frac{L}{L} \to 1: \frac{F}{L} = \frac{\mu_0 I^2}{2\pi a} \; Hm^{-1}A^2m^{-1}$$

Rationalize the units to force per unit length:

$$\frac{F}{L} = \frac{\mu_0 I^2}{2\pi a} Nm^{-1}.$$

Then for $a=1$ m and $I=1A$, $$\frac{F}{L} = \frac{\mu_0}{2\pi} = \frac{4\pi \cdot 10^{-7}}{2\pi} = 2\times 10^{-7} \; Nm^{-1}.$$

This is in accordance with the ampere definition of two "infinitely" long wires each carrying 1A, separated by 1 m in vacuum: "The ampere is that steady current which when it is flowing in each of two infinitely long straight parallel wires which have negligible areas of cross-section and are 1 meter apart in vacuum, causes each conductor to exert a force of $2\times 10^{-7}$ N on each meter of the other."

Action Motor

A practical propulsion device can utilize the principles set forth herein to great advantage. Such a device, referred to as an "action motor" herein, can advantageously consist of two parallel plates of super-conducting elements mounted in a non-conducting substrate. Current is pulsed through the conducting elements in a controlled manner to produce forces on one plate, but not on the other. The best way to understand the form and function of the action motor is to consider it from first principles. Once these principles are understood, the design follows.

Two idealized parallel current-carrying conducting wires experience attractive forces according to electrodynamic form (i.e., relativistic form) of Coulomb's equation, $$F = \frac{\mu_0 I^2}{4\pi a} \left[ -\{a^2 + (l_2 - h_2)^2\}^{1/2} + \{a^2 + (l_1 - h_2)^2\}^{1/2} + \{a^2 + (l_2 - h_1)^2\}^{1/2} - \{a^2 + (l_1 - h_1)^2\}^{1/2} \right]. \quad (i)$$

In a steady state condition, with equal current in both segments, the attractive forces are experienced by both wires. However, the signal from wire L takes a finite, non-zero time to reach wire H, that time being a/c, where a is the separation of the two wires and c is the velocity of light, in the relevant medium. This can be used to generate non-symmetric forces in L and H by pulsing current I through them as illustrated in FIG. 6 and FIG. 7. In FIG. 6 and FIG. 7 the units are as follows:

$p$=pulse duration=$T/3$ $T$=time of one cycle=$1/f$ $f$=drive frequency in Hz $f=c/(3a)$ where a=segment length=plate separation in meters Distance a is fixed for a particular action motor, but is flexible to support action motors of different scales. Typical values for a would range from 1 cm to 1 km. For example, if a=1 cm, i.e., $10^{-2}$ m, then $f=3 \times 10^8 / (3 \times 10^{-2}) = 10^{10}$ Hz, i.e., 10 GHz $T=1/10^{10}=10^{-10}$ seconds, and p=$10^{-10}/3$ seconds This is the basic principle of the action motor. The one-way force is multiplied by using an array of elements, each of length a, optimally separated by gaps of length ($\sqrt{5}-1$)a parallel to current, and by gaps of length $\sqrt{5}$a normal to the current. The geometric arrangements are shown in section views in FIGS. 3–5, where b=$\sqrt{5}$a and so b−a=($\sqrt{5}-1$)a.

For the next analysis, consider a segment pair, i.e., just 2 of the current segments, one in each plate, called segment 110 and segment 220 in plate 100 and plate 200 respectively, as shown in FIG. 2. The current segments in each plate are subject to electrical currents in the periods as shown in FIG. 7.

Period 1: when segment 110 is conducting.

Period 2: the timing of these currents is such that when segment 210 is conducting in period 2, it simultaneously receives the magnetic field generated by segment 110 in period 1; the time delay is attributable to the magnetic field traveling out from segment 110 at the speed of light in the medium. Since segment 210 is conducting and simultaneously experiencing the magnetic field from segment 110, then segment 210 experiences an attractive force towards segment 110.

Period 3: neither segment is conducting and so neither segment experiences a force.

Period 4: in period 4, segment 110 is conducting but it does not experience a magnetic force from segment 210 since segment 210 was not conducting in period 3, hence segment 110 does not experience a force.

The sum effect of periods 2, 3, 4, i.e. one cycle is as follows:

Period 2: segment 210 experiences an attractive force towards segment 110

Period 3: no force experienced by either segment

Period 4: no force experienced by either segment

Over this 3 period interval the net effect is a force on segment 210, directed toward segment 110.

The same effect occurs in periods (5, 6, 7) and periods (8, 9, 10) and so on. The net effect over time is a force on segment 210, directed toward segment 110. Since the segments are fixed in the plates, the net effect of the current waves is a force on plate 200; and since plate 200 is fixed in the device, the whole device experiences a force directed from plate 200 to plate 100.

Note that in FIG. 1 as magnetic fields propagate in direction +z from the segments of plate 200 there is no force effect on any segment of either plate, since all magnetic fields are moving away from the device. Similarly for plate 100: as magnetic fields propagate in direction −z from the segments of plate 100 there is no force effect on any segment of either plate, since all magnetic fields are moving away from the device. Also, the energy of the radiated magnetic fields dissipated away from the device is symmetric for the two plates and so is zero: The only force experienced by the device is that of plate 200 in its conducting segments.

Physical Description

The action motor comprises two plates of conducting segments, distance a apart, FIG. 1. Each conducting segment is of length a, equal to the separation, FIG. 3. The two plates are rigidly connected to each other so that they cannot move relative to each other. The separation distance a is fixed for a particular action motor, but this patent covers designs for any a. A small device might use a separation of a=1 cm. A large space-based device might use a separation of a=1 m (meter) or 1 km. The use of a large separation a facilitates the use of a lower frequency current. This scaleability will enable future devices to be built increasingly small as faster pulsing technology becomes available.

Each plate contains an array of conducting segments mounted in a non-conducting substrate, FIG. 3.

The conductors of each plate are pulsed with current I at a frequency dependent on the separation of the plates, FIG. 6.

The currents in the two plates are phased, FIG. 7.

The segment feeder wires are arranged perpendicularly to the plate surface, so as to not interfere with the plate force FIG. 2.

Each plate has M elements in the x direction, and N elements in the y direction.

M is fixed for a particular action motor, but this patent covers designs for any M.

Similarly N is fixed for a particular action motor, but this patent covers designs for any N.

Typical devices would use M and N in the order of 100 to 1000. M and N may be equal, but they need not be equal.

Magnitude of the Force Produced

The net force produced by the action motor is independent of the size of the separation a (a cancels in the force derivation); as far as physical dimensions are concerned, the net force depends only on M and N. So for example, a action motor having M=N=100, a=0.1 meter, will produce the same force as a action motor having M=N=100, a=10 meters.

The net force on the action motor is calculated by considering the net force due to each segment in Plate 100 interacting with each segment of Plate 200. I.e. the force due to a single segment is calculated by summing the contributions from its neighboring segments on the opposite plate. The total force on the action motor is the sum of all the forces on the individual segments.

Individual Segment Interactions

Nomenclature: in the analysis that follows, the indices m and n are relative cardinal segment displacements in x and y. Index (0,0) in Plate 100 represents the Plate 100 segment under examination (the relative origin). Indexes (m,n) represent neighboring segments in Plate 200, such that Plate 200 (0,0) is the segment pair companion of Plate 100 (0,0), see FIG. 5.

$F_{m,n}$ is the force experienced on Plate 200 (m,n) due to current in Plate 100 (0,0).

From equation (i), the force between any two parallel wires is:

$$F = \frac{\mu_0 I^2}{4\pi a}\left[-\{a^2+(l_2-h_2)^2\}^{1/2} + \{a^2+(l_1-h_2)^2\}^{1/2} + \{a^2+(l_2-h_1)^2\}^{1/2} - \{a^2+(l_1-h_1)^2\}^{1/2}\right]$$

Where a is the distance shown in FIG. 9. Adapting this for the action motor, let the perpendicular segment separation be $A=\sqrt{1+15n^2}a$ as in FIG. 4:

$$F = \frac{\mu_0 I^2}{4\pi A}\left[-\{A^2+(l_2-h_2)^2\}^{1/2} + \{A^2+(l_1-h_2)^2\}^{1/2} + \{A^2+(l_2-h_1)^2\}^{1/2} - \{A^2+(l_1-h_1)^2\}^{1/2}\right]$$

Substitute in values $\mu_0 = 4\pi \times 10^{-7} Hm^{-1}, l_1 = 0, l_2 = a, h_1 = m\sqrt{15}\,a, h_2 = m\sqrt{15}\,a+a$ $$F = \frac{10^{-7}I^2}{A}\left[-\{A^2+15m^2a^2\}^{1/2} + \{A^2+(ma\sqrt{15}+a)^2\}^{1/2} + \{A^2+(ma\sqrt{15}-a)^2\}^{1/2} - \{A^2+15m^2a^2\}^{1/2}\right]$$

Substitute in $A^2=a^2+n^2 15a^2=a^2(1+15n^2)$ $$F = \frac{10^{-7}I^2}{a\sqrt{1+15n^2}}\left[-\{a^2(1+15n^2)+15m^2a^2\}^{1/2} + \{a^2(1+15n^2)+(m\sqrt{15}+1)^2 a^2\}^{1/2} + \{a^2(1+15n^2)+(m\sqrt{15}-1)^2 a^2\}^{1/2} - \{a^2(1+15n^2)+15m^2a^2\}^{1/2}\right]$$

a cancels $$F = \frac{10^{-7}I^2}{\sqrt{1+15n^2}}\left[-\{1+15n^2+15m^2\}^{1/2} + \{1+15n^2+(m\sqrt{15}+1)^2\}^{1/2} + \{1+15n^2+(m\sqrt{15}-1)^2\}^{1/2} - \{1+15n^2+15m^2\}^{1/2}\right]$$

collect terms:

$$F = \frac{10^{-7}I^2}{\sqrt{1+15n^2}}\left[-2\{1+15n^2+15m^2\}^{1/2} + \{1+15n^2+(m\sqrt{15}+1)^2\}^{1/2} + \{1+15n^2+(m\sqrt{15}-1)^2\}^{1/2}\right]$$

Segment forces calculated with this equation are shown in Table 1.

TABLE 1

| | Force $F_{m,n}$/Newtons (x$I^2$) | | | | |
|---|---|---|---|---|---|
| | m = 0 | m = 1 | m = 2 | m = 3 | m = 4 |
| n = 0 | 8.284271E−08 | 1.657607E−09 | 2.133211E−10 | 6.351320E−11 | 2.683900E−11 |
| n = 1 | 6.155281E−09 | 2.343748E−09 | 6.096187E−10 | 2.168178E−10 | 9.800905E−11 |
| n = 2 | 1.632680E−09 | 1.178737E−09 | 5.885852E−10 | 2.855185E−10 | 1.499315E−10 |
| n = 3 | 7.339474E−10 | 6.279738E−10 | 4.252823E−10 | 2.617651E−10 | 1.601844E−10 |
| n = 4 | 4.145082E−10 | 3.787467E−10 | 2.972741E−10 | 2.130374E−10 | 1.472746E−10 |

To illustrate the plate force, consider a action motor of size M×N=2×3, as depicted in the non-shaded cells of Table 1.

Due to symmetry, $F_{m,n}=F_{m,n}$

Timing Differences

The forces in Table 1 need to be adjusted to recognize the partial Plate 100 and Plate 200 forces attributable to timing differences. In the ideal situation, as occurs in segment (m,n) and its four nearest neighbors, the Plate 100 contribution is 0% and the Plate 200 contribution is 100%. This ideal does not extend to the more distant neighbors due to Plate 100 to Plate 200 segment separations not being exact multiples of (1+3J)a, where J is an integer and a is the plate separation. Timing differences are illustrated in FIG. 8, based on the line-of-sight segment distances, B, from FIG. 5.

From FIG. 5, $B=\sqrt{1+15(m^2+n^2)}a$

Line of sight distances for the unshaded segments of Table 1 are shown in Table 2:

TABLE 2

Line-of-sight distances from Plate 100 (0, 0) to Plate 200 (m, n)

|  | m = 0 | m = 1 |
| --- | --- | --- |
| n = 0 | a | 4a |
| n = 1 | 4a | $\sqrt{15}$ a = 5.568 a |
| n = 2 | $\sqrt{61}$ a = 7.810 a | $\sqrt{31}$ a = 8.718 a |

Explanation of FIG. 8:

The overlap of the Plate 100 (0,0) signal with Plate 200 (m,n) produces an attractive force on Plate 200 which is beneficial to the net force on the action motor. Contrary-wise, the overlap of the Plate 200 (m,n) signal on Plate 100 (0,0) produces an attractive force on Plate 100 which is detrimental to the action motor. The time units of FIG. 8 are as follows:

$p$=pulse duration=$T/3$, $T$=time of one cycle=$1/f$, $f$=drive frequency in Hz $f=c/(3a)$ where $a$=segment length=plate separation in meters Distance a is fixed for a particular action motor, but is flexible to support action motors of different scales.

Typical values for a would range from 1 cm to 1 km
For example, if a=1 cm, i.e., $10^{-2}$ m, then $f=3\times10^8/(3\times10^{-2})=10^{10}$ Hz, i.e., 10 GHz $T=1/10^{10}=10^{-10}$ seconds, and $p=10^{-10}/3$ seconds Note: due to the Plate 200 phase shift of p, the Plate 100 arrival times are delayed (right-shifted) by p From FIG. 8, the augmenting factors for the unshaded segments of Table 1 are shown in Table 3:

TABLE 3

Segment multiplicative timing adjustments

|  | m = 0 | m = 1 |
| --- | --- | --- |
| n = 0 | 1 | 1 |
| n = 1 | 1 | −0.432 |
| n = 2 | −0.62 | −0.282 |

Applying these multiplicative factors to the non-shaded elements of Table 1 yields Table 4:

TABLE 4

Augmented forces of Table 1 and Table 3/Newtons ($\times I^2$)

|  | m = 0 | m = 1 |
| --- | --- | --- |
| n = 0 | 8.284271E-08<br>A | 1.657607E-09<br>D |
| n = 1 | 6.155281E-09<br>B | −1.012499E-09<br>E |
| n = 2 | −1.012261E-09<br>C | −3.324038E-10<br>F |

For simplicity, the cells (0,0), (0,1), (0,2), (1,0), (1,1) and (1,2) above have been labeled A, B, C, D, E, and F respectively.

Then the plate force, $F_p$, is:

$F_p = F_{0,0} + F_{0,1} + F_{0,2} + F_{1,0} + F_{1,1} + F_{1,2}$

Where each $F_{m,n}$ is the sum of the six segments on the opposing plate. Then, taking account of the symmetry, $F_{m,n} = F_{m,n}$, the total action motor force for the 2×3 example is the sum of the six components:

$F_{0,0} = A+B+C+D+E+F = 8.829843\times10^{-8} I^2$ $F_{0,1} = A+B+B+D+E+E = 9.478588\times10^{-8} I^2$ $F_{0,2} = A+B+C+D+E+F = 8.829843\times10^{-8} I^2$ $F_{1,0} = A+B+C+D+E+F = 8.829843\times10^{-8} I^2$ $F_{1,1} = A+B+B+D+E+E = 9.478588\times10^{-8} I^2$ $F_{1,2} = A+B+C+D+E+F = 8.829843\times10^{-8} I^2$ Then using $F_p = F_{0,0} + F_{0,1} + F_{0,2} + F_{1,0} + F_{1,1} + F_{1,2}$, $F_p = 5.427655\times10^{-7} I^2$ and the average force per segment is $$\frac{5.427655\times10^{-7}}{6} I^2 = 9.046091\times10^{-8} I^2.$$

The above analysis is applied to plates of various dimensions as shown below. The numbers show the plate dimension, M×N, the total action motor force, and the average force per segment pair.

TABLE 5

Force (in Newtons) calculations for various action motor sizes:

| M × N | total force ($\times I^2$) | average force per segment ($\times I^2$) |
| --- | --- | --- |
| 1 × 1 | 8.284 × $10^{-8}$ | 8.284 × $10^{-8}$ |
| 2 × 2 | 3.586 × $10^{-7}$ | 8.964 × $10^{-8}$ |
| 2 × 3 | 5.428 × $10^{-7}$ | 9.046 × $10^{-8}$ |
| 3 × 3 | 8.099 × $10^{-7}$ | 8.998 × $10^{-8}$ |
| 4 × 4 | 1.432 × $10^{-6}$ | 8.949 × $10^{-8}$ |
| 5 × 5 | 2.232 × $10^{-6}$ | 8.929 × $10^{-8}$ |
| 10 × 10 | 8.846 × $10^{-6}$ | 8.846 × $10^{-8}$ |
| 20 × 20 | 3.518 × $10^{-5}$ | 8.795 × $10^{-8}$ |
| 50 × 50 | 2.190 × $10^{-4}$ | 8.761 × $10^{-8}$ |
| 100 × 100 | 8.749 × $10^{-4}$ | 8.749 × $10^{-8}$ |

These numbers were calculated using a computer program to implement the method previously described. The 100×100 case took just over 27 hours to complete. For this reason, forces for M, N>100 were not calculated. However, it can be seen from the averages that for large action motor size, the average force per segment, $F_s$, is approximately $8.7\times10^{-8} I^2$ Newtons.

This force is further augmented by the ⅓ temporal pulse used as the segment current, (FIG. 7) thus reducing the effective force by a factor of 3:

$F_s \approx 8.7\times10^{-8}/3 I^2$ Newtons $F_s \approx 2.9\times10^{-8} I^2$ Newtons Example action motor applying the above force to plates of 1000×1000 segments carrying 100 Amps:

M=N=1000

I=100 Amps action motor force $F_p = M\times N\times F_s\times I\times I$ Newtons action motor force $F_p = 1000\times1000\times2.9\times10^{-8}\times100\times100 = 290$ N As technology advances, it will become possible to build action motors of higher and higher frequency, facilitating a smaller separation, a, and larger M and N values. Similarly, as superconductor technology advances, action motors will be able operate at higher currents.

Consider a case where M=N=100000 and I=1000 Amps, then using action motor force $F_p = M \times N \times F_s \times I \times I$ Newtons action motor force $F_p = 100000 \times 100000 \times 2.9 \times 10^{-8} \times 1000 \times 1000 = 290,000,000 \; N$ Thus, specific embodiments and applications of the action motor have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

I claim:

1. A method of producing a propulsive force, comprising; with respect to a device having:
   first and second parallel conducting plates, distance "a" apart, each of which includes a plurality of arrayed segments;
   at least some of the segments on each of the plates has a length of "1", wherein 0<1≦100a, and
   a first current of pulse width "p1" that passes through at least one of the segments of the first plate, wherein 0<p1≦3a/2c, and c is the speed of light;
   operating the device wherein the first current has a step wave form with a duty cycle between 0.5 and 0.8.

2. The method of claim 1, wherein the step wave has a duty cycle between 0.6 and 0.7.

3. The method of claim 2, further comprising operating the device such that the first and second currents are out of phase by at least 2π/3±20%.

4. A method of producing a propulsive force, comprising:
   with respect to a device having:
   first and second parallel conducting plates, distance "a" apart, each of which includes a plurality of arrayed segments;
   at least some of the segments on each of the plates has a length of "1", wherein 0<1≦100a, and
   a first current of pulse width "p1" that passes through at least one of the segments of the first plate, wherein 0<p1≦3a/2c, and c is the speed of light;
   operating the device with a second current of pulse width p2 that passes through at least one of the segments of the second plate, and wherein the first current is out of phase with the second current.

* * * * *